US008720760B1

(12) United States Patent
Simpson

(10) Patent No.: US 8,720,760 B1
(45) Date of Patent: May 13, 2014

(54) HEAVY DUTY, LEVERAGED SPARE TIRE CARRIER

(71) Applicant: Donald Simpson, Fort Collins, CO (US)

(72) Inventor: Donald Simpson, Fort Collins, CO (US)

( * ) Notice: Subject to any disclaimer, the term of this patent is extended or adjusted under 35 U.S.C. 154(b) by 0 days.

(21) Appl. No.: 14/072,781

(22) Filed: Nov. 5, 2013

Related U.S. Application Data

(60) Provisional application No. 61/722,699, filed on Nov. 5, 2012.

(51) Int. Cl.
*B62D 43/02* (2006.01)

(52) U.S. Cl.
USPC ......... 224/509; 224/519; 224/532; 224/42.21

(58) Field of Classification Search
USPC ......... 224/282, 495, 502, 509, 519, 531, 532, 224/42.12, 42.13, 42.21, 42.24
See application file for complete search history.

(56) References Cited

U.S. PATENT DOCUMENTS

| | | | | | |
|---|---|---|---|---|---|
| 3,822,814 | A | * | 7/1974 | Baldi | 224/502 |
| 4,946,084 | A | * | 8/1990 | Britto | 224/42.21 |
| 4,964,552 | A | * | 10/1990 | Terwilliger | 224/42.23 |
| 5,370,285 | A | * | 12/1994 | Steelman | 224/42.21 |
| 5,469,998 | A | * | 11/1995 | Van Dusen et al. | 224/506 |
| 6,659,318 | B2 | * | 12/2003 | Newbill | 224/503 |
| 6,874,804 | B2 | * | 4/2005 | Reese et al. | 280/477 |
| 6,918,520 | B2 | * | 7/2005 | Skinner | 224/282 |
| 7,249,927 | B2 | * | 7/2007 | Wooten et al. | 414/466 |

* cited by examiner

*Primary Examiner* — Justin Larson

(57) ABSTRACT

A heavy duty, leveraged spare tire carrier utilizes a cross or T-shaped frame configured so a spare tire for an recreational vehicle can be bolted thereto and mounted on a receiver-type hitch common in the RV industry with a secondary receiver hitch mounted thereon. The carrier has an integral lever-actuated lifting and lowering apparatus to allow a single person the ability to remove and replace a spare tire on the carrier and/or to swing the carrier and spare tire out of the way so an engine or other compartment in the rear of an RV can still be accessed.

17 Claims, 7 Drawing Sheets

HEAVY DUTY, LEVERAGED SPARE TIRE CARRIER

CROSS-REFERENCE TO RELATED APPLICATIONS

This application claims the benefit of U.S. Provisional Application No. 61/722,699 entitled HEAVY DUTY, LEVERAGED SPARE TIRE CARRIER and filed on Nov. 5, 2012, which is specifically incorporated by reference herein for all that it discloses and teaches.

TECHNICAL FIELD

The present invention relates generally to the field of motor vehicles; more particularly, to large, recreational-vehicle-type motor vehicles; and more particularly still, to a heavy duty, leveraged spare tire carrier that can be installed on a receiver hitch commonly found on recreational vehicles and is actuatable by a single person.

BACKGROUND

Motor vehicles have been in common usage for nearly a century. Shortly after the first, rather small, personal automobiles were rolling off assembly lines, larger trucks and related vehicles began to be produced in large numbers as well. Towable trailers equipped with living quarters soon followed, and it wasn't long before such trailers were placed on a truck chassis and the recreational vehicle ("RV") or motorhome was born. Today, such vehicles can be exceedingly large, requiring huge, heavy tires (in comparison to a standard automobile tire). Such tires, especially when affixed to a wheel and ready to be installed on the motorhome in place of a flat tire (such wheel and tire assemblies are ubiquitously referred to as spare tires), can weigh in excess of one hundred pounds and are quite unwieldy and difficult to handle. Perhaps for these reasons, many motorhomes and other large RVs often do not carry a spare tire. Thus, if the driver of such a vehicle is unfortunate enough to experience a flat tire, his or her only option is to call for assistance. Because recreational vehicles are often used to recreate in far-flung locations, assistance can be a long distance away, difficult to procure, and often very expensive, if available at all.

Most small motor vehicles (such as cars and light trucks) carry a spare tire either in the trunk, under the chassis, or otherwise attached to the automobile so that, in the case of a flat tire, the operator can remove the flat, install the spare tire, and drive the vehicle to a repair station for further assistance. Because many motorhome owners are familiar with this state of affairs when operating their smaller automobiles, they lament the fact that such a spare tire assembly is too big and heavy to be commonly installed in recreational vehicles and are often completely unprepared to deal with a flat tire if such occurs while they are operating their RV.

Since many manufacturers of RVs do not include a spare tire or even a mounting location for an owner to carry an after-market spare tire with them, there is currently a need for an RV spare tire carrier. However, as noted above, spare tires for RVs are exceedingly heavy and unwieldy, so spare tire carriers, as currently known in the art, are not built heavy enough to handle such spares and can not just be welded onto an RV because a single person could be crushed trying to remove a spare tire therefrom. Instead, what is needed is a heavy duty, leveraged spare tire carrier than can be easily installed onto almost all RVs, is strong enough to carry the weight and bulk of an RV spare tire, and yet is configured in such a way as to allow a single person to load and unload the spare tire from the carrier without risking life and limb in the process.

SUMMARY

One embodiment of the present invention comprises a heavy duty, cross or T-shaped frame configured so a spare tire for an RV can be bolted thereto and mounted on a receiver-type hitch common in the RV industry with a secondary receiver hitch mounted thereon, and having an integral lever-actuated lifting and lowering apparatus to allow a single person the ability to remove and replace a spare tire on the carrier and/or to swing the carrier and spare tire out of the way so an engine or other compartment in the rear of an RV can still be accessed.

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein.

DETAILED DESCRIPTION

Figure 1:
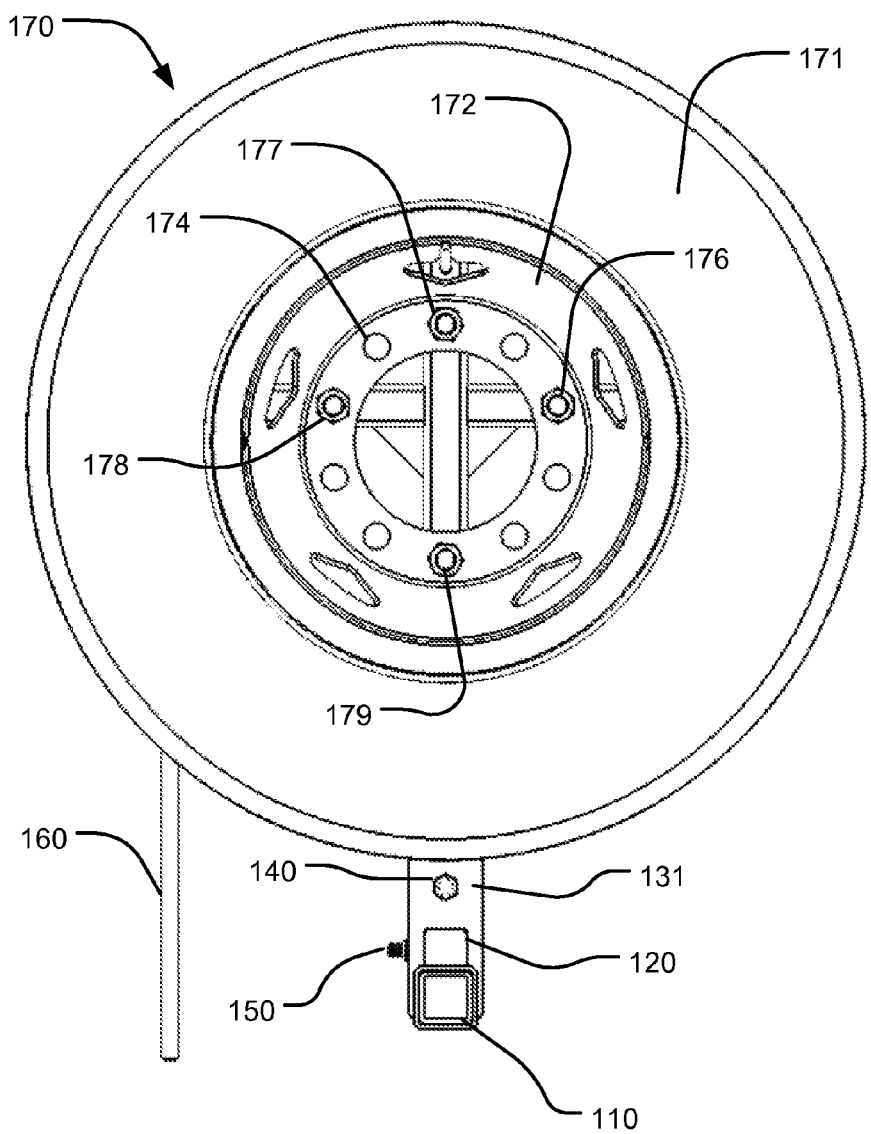
FIG. 1 illustrates a front elevation view of an exemplary embodiment of a heavy duty, leveraged spare tire carrier with a spare tire attached.

Referring now to the drawings, FIG. 1 illustrates a front elevation view of an exemplary embodiment of a heavy duty, leveraged spare tire carrier 100 with a spare tire 170 attached thereto. Note that in FIG. 1, the spare tire 170 includes both common components: the tire 171 already mounted onto the rim or wheel 172. Throughout this document, whenever a reference is made to a spare tire 170, it includes both a tire 171 and a wheel 172, unless otherwise described. The carrier 100 shown in FIG. 1 is mostly hidden behind the spare tire 170; reference to later drawing FIGS. is recommended.

The wheel 172 includes a plurality of mounting points 174 (often numbering ten on many RV wheels, as shown in FIG. 1, but other numbers are contemplated). In the embodiment illustrated in FIG. 1, there are four mounting bolts 176, 177, 178 and 179 illustrated utilizing four of the plurality of mounting points 174. In other embodiments, the number of mounting bolts may be higher or lower than that shown in FIG. 1. The mounting bolts 176-179 serve to removably affix the spare tire 170 to the carrier 100.

The front hinge bracket 131 can be seen below the spare tire 170 in FIG. 1. The main body of the carrier 100 hinges on the hinge bolt 140 that runs through the front hinge bracket 131 and the rear hinge bracket (not shown in FIG. 1, see item 232 in FIG. 2). In order to mount the carrier 100 onto the RV, a draw bar 120 is affixed to the carrier 100. Because installation of a draw bar 120 into the receiver hitch opening on an RV blocks usage of said receiver hitch, a secondary receiver hitch 110 is installed on the carrier 100 itself to allow for use of other draw bars so that the RV can still tow trailers, etc. while the heavy duty, leveraged spare tire carrier 100 is installed on the RV. Once the draw bar 120 is inserted into the receiver hitch on the RV, a hitch pin bolt 150 and nut (or other securing device) secures it therein.

A leverage handle 160 is also partially shown in FIG. 1. This implement is installed near the top of the main body of the carrier 100 when a person wishes to raise or lower the spare tire 170. See later drawing FIGS. for additional descriptions of the leverage handle 160.

Figure 2:
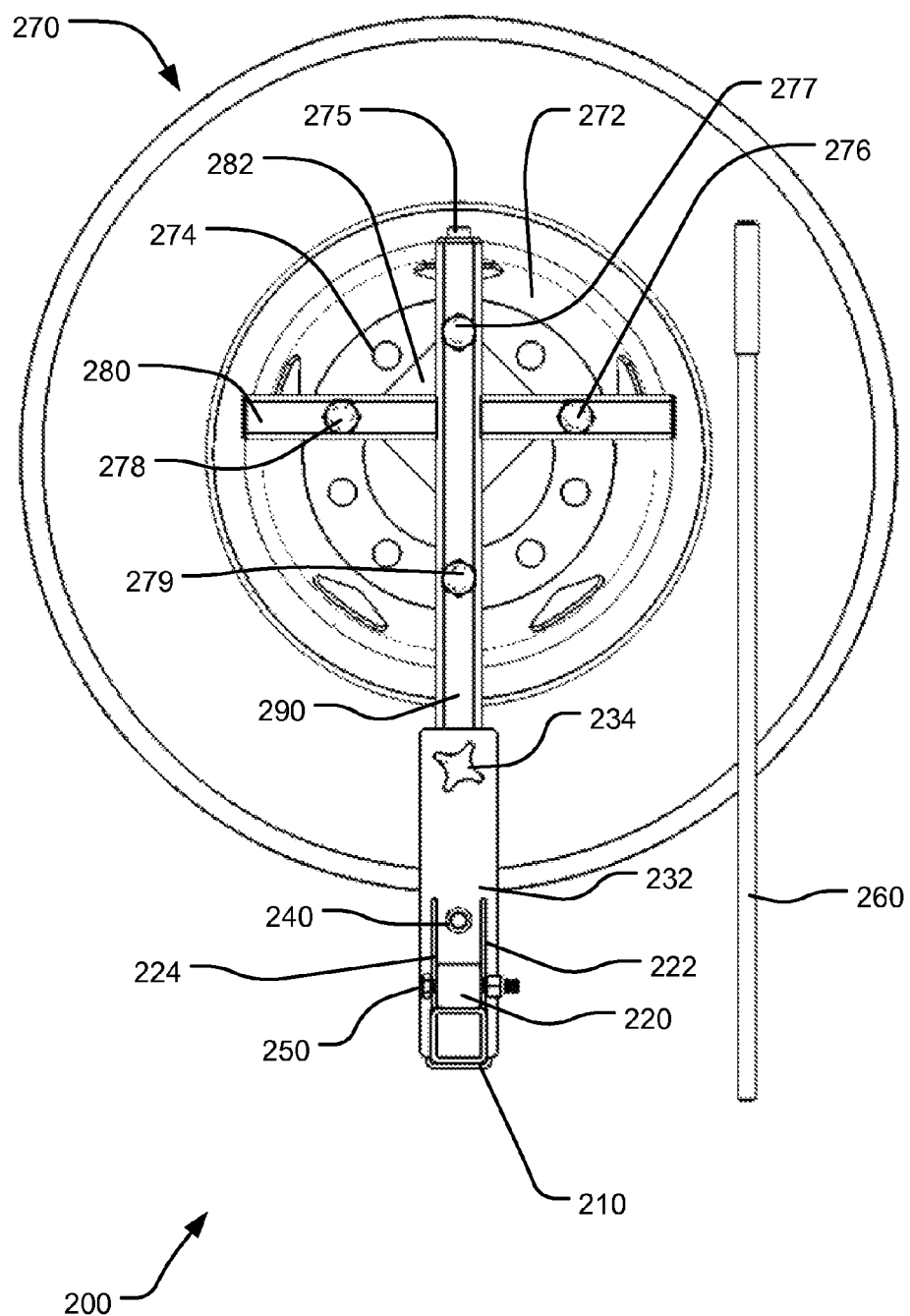
FIG. 2 illustrates a rear elevation view of an exemplary embodiment of a heavy duty, leveraged spare tire carrier with a spare tire attached.

FIG. 2 illustrates a rear elevation view of an exemplary embodiment of a heavy duty, leveraged spare tire carrier 200 with a spare tire 270 attached thereto. As in FIG. 1, the spare tire 270 includes both the tire 271 and the wheel 272 with the tire mounted thereon. Since FIG. 2 is a rear view, the carrier 200 can be more clearly seen than in FIG. 1.

The wheel 272 includes a plurality of mounting points 274. In the embodiment illustrated in FIG. 2, there are four mounting bolts 276, 277, 278 and 279 illustrated utilizing four of the plurality of mounting points 274. The mounting bolts 276-279 serve to removably affix the spare tire 270 to the carrier 200.

The front hinge bracket is not shown in FIG. 2, see FIG. 1, item 131. The rear hinge bracket 232 is shown. Together, the two hinge brackets form a set of upright members affixed to the draw bar 220. Vertical support members 222 and 224 are affixed to the draw bar 220, the rear hinge bracket 232, and the secondary receiver hitch 210. These support members 222 and 224 strengthen the carrier 200 so that it can securely hold the spare tire 270 while withstanding the large forces exerted on the secondary receiver hitch 210 when a heavy trailer is attached to the RV via the carrier 200.

The main body of the carrier 200 can hinge or swing downwards from the upright position shown in FIG. 2 into a lowered position (see FIG. 7) so that a person can access the rear of the RV and/or can remove the spare tire 270 from the carrier 200. The hinge bolt 240 extends through the two upright hinge brackets 131 and 232, as well as the vertical member 290 of the main body of the carrier 200. A release pin 234 is attached to at least one of the upright hinge brackets 131 and 232 and ensures that the vertical member 290 stays in an upright position until the release pin 234 is actuated, releasing the vertical member 290 from its position between the hinge brackets 131 and 232. Once released, the vertical member 290 can hinge on the hinge bolt 240 and be swung down to either side of the carrier 200. See later FIGS. for more detail on the hinge mechanism.

The vertical member 290 can be manufactured from square steel tubing as shown in FIG. 2. In other embodiments, other metals or materials of sufficient strength can be utilized. In yet other embodiments, the vertical member 290 can be solid and it can have other cross-sectional shapes besides square. In FIG. 2, two of the mounting bolts 279 and 277 are attached to the vertical member 290 and the remaining two mounting bolts 278 and 276 are attached to the horizontal member 280.

The horizontal member 280 is attached to the vertical member 290 and generally extends perpendicular thereto, with approximately half of the horizontal member 280 extending to the left of the vertical member 290 and approximately half of the horizontal member 280 extending to the right. The horizontal member 280 can be manufactured from square steel tubing as shown in FIG. 2, but like the vertical member 290, in other embodiments, the horizontal member 280 can be manufactured from other metals or materials of sufficient strength and it can be solid and/or have a cross-sectional shape besides a square (for example, rectangular, round, oval, hexagonal, or other shapes of tubing or solid material can be employed). In order to enhance the strength of the horizontal and vertical members 280 and 290 and the connection therebetween, a plurality of angle supports 282 can be attached at each corner of the joint between the members 280 and 290. As shown in FIG. 2, the plurality of angle supports 282 can be triangular shaped metal pieces that are welded or otherwise connected to the horizontal member 280 and vertical member 290. In other embodiments, the number of angle supports 282 can be one, two, three, four, or none.

In order to mount the carrier 200 onto the RV, a draw bar 220 is affixed to the carrier 200. Because installation of a draw bar 220 into the receiver hitch opening on an RV blocks usage of said receiver hitch, a secondary receiver hitch 210 is affixed on the carrier 200 below the draw bar 220. The secondary receiver hitch 210 allows for use of other draw bars so that the RV can still tow trailers, etc. while the heavy duty, leveraged spare tire carrier 200 is installed on the RV. Once the draw bar 220 is inserted into the receiver hitch on the RV, a hitch pin bolt 250 and nut (or other securing device) secures it therein.

An exemplary leverage handle 260 is shown in FIG. 2. This implement is installed in leverage attachment point 275 located near the top of the vertical member 290 when a person wishes to raise or lower the spare tire 270. The leverage handle 260 can be threaded into the leverage attachment point 275, can be simply slid into the leverage attachment point 275, or some other attachment mechanism can be employed so that the leverage handle 260 can act on the vertical member 290. Regardless of the means of attachment, the leverage handle 260 allows a single person to lower and raise the spare tire 270 by hinging the vertical member 290 on the hinge bolt 240. Because the leverage handle 260 extends the distance between the hinge bolt 240 and the location at which a user exerts force against the vertical member 290, significant leverage is gained, thereby allowing a single person to raise and lower the extremely heavy spare tire 270 with ease. See later drawing FIGS. for additional descriptions of the leverage handle 260, hitch pin bolt 250 and hinging mechanism. In another embodiment the leverage attachment point is attached to the horizontal member such that the leverage handle can be attached to the horizontal member and can act upon the horizontal member in order to raise or lower the spare tire.

Figure 3:
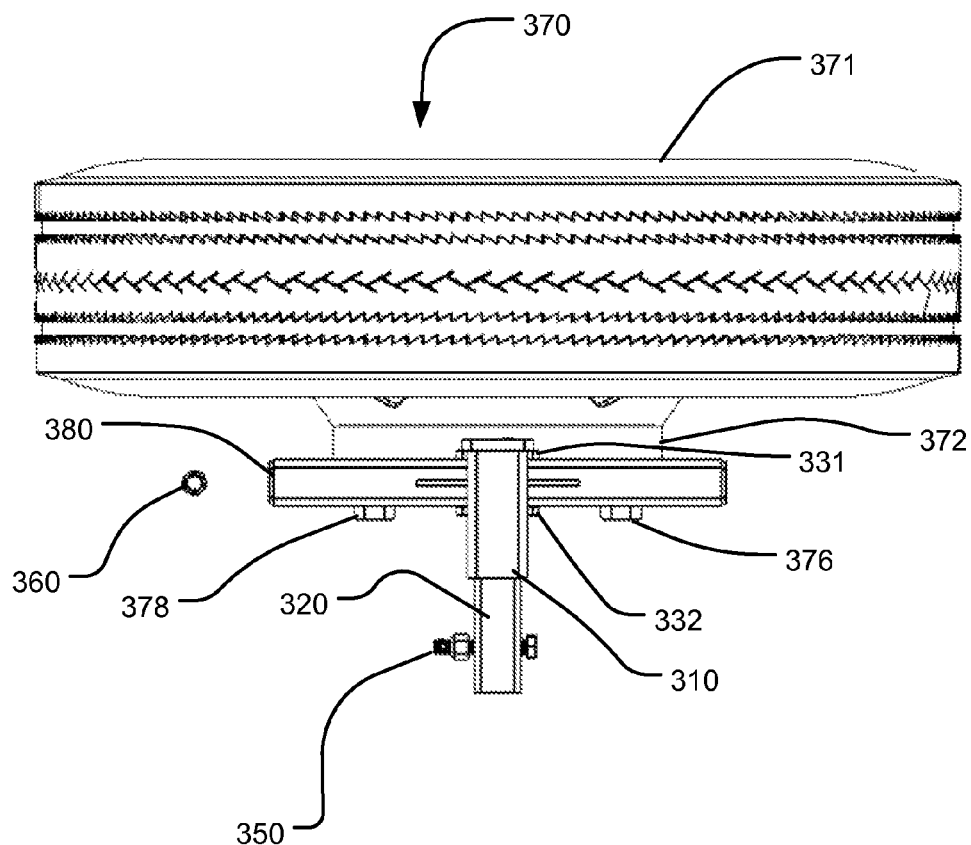
FIG. 3 illustrates a bottom plan view of an exemplary embodiment of a heavy duty, leveraged spare tire carrier with a spare tire attached.

FIG. 3 illustrates a bottom plan view of an exemplary embodiment of a heavy duty, leveraged spare tire carrier 300 with a spare tire 370 attached thereto. The relative position of the tire 371 and the wheel 372 can be seen more clearly from this viewing angle. Also, the attachment bolts 376 and 378 can be seen extending through the horizontal member 380 and attaching the wheel 372 to the horizontal member 380. The attachment bolts that attach the wheel to the vertical member are not visible in this view.

The body of the secondary receiver hitch affixed to the bottom of the carrier 300 can be clearly seen in FIG. 3. Above it, the draw bar 320 extends perpendicular to the horizontal member 380 and the hitch pin bolt 350 can be seen extending through the draw bar 320. It should be apparent that when the draw bar 320 is inserted into the receiver hitch on an RV, the hitch pin bolt 350 would pass through the receiver hitch and through the draw bar 320, securing the draw bar 320 inside the receiver hitch. In FIG. 3, the hitch pin bolt 350 is shown as a hexagonal headed bolt with a nut and a hole running through the hitch pin bolt 350, providing a location through which a pin or other securing mechanism can be placed in order to ensure that the nut can not inadvertently rotate off of the bolt 350. In other embodiments, other types of hitch pin bolts 350 as known in the art can be employed (e.g., locking hitch pins, L handled pins, T handled pins, etc.).

The bottom portions of the hinge brackets 331 and 332 can be seen in FIG. 3. See later FIGS. for more detail of the hinge brackets 331 and 332. Also illustrated in FIG. 3 is the leverage handle 360. Because FIG. 3 provides a bottom view and the leverage handle 360 is depicted standing vertically, only the bottom portion of the leverage handle 360 is visible. In the embodiment in FIG. 3, the leverage handle 360 appears to have an outer perimeter that is circular-shaped; in other embodiments, the leverage handle 360 can have an outer perimeter that is shaped like a square, triangle, oval, or any other shape. Although not shown in FIG. 3, the leverage attachment point should be shaped to match so that the leverage handle 360 can be inserted therein or otherwise attached thereto.

Figure 4:
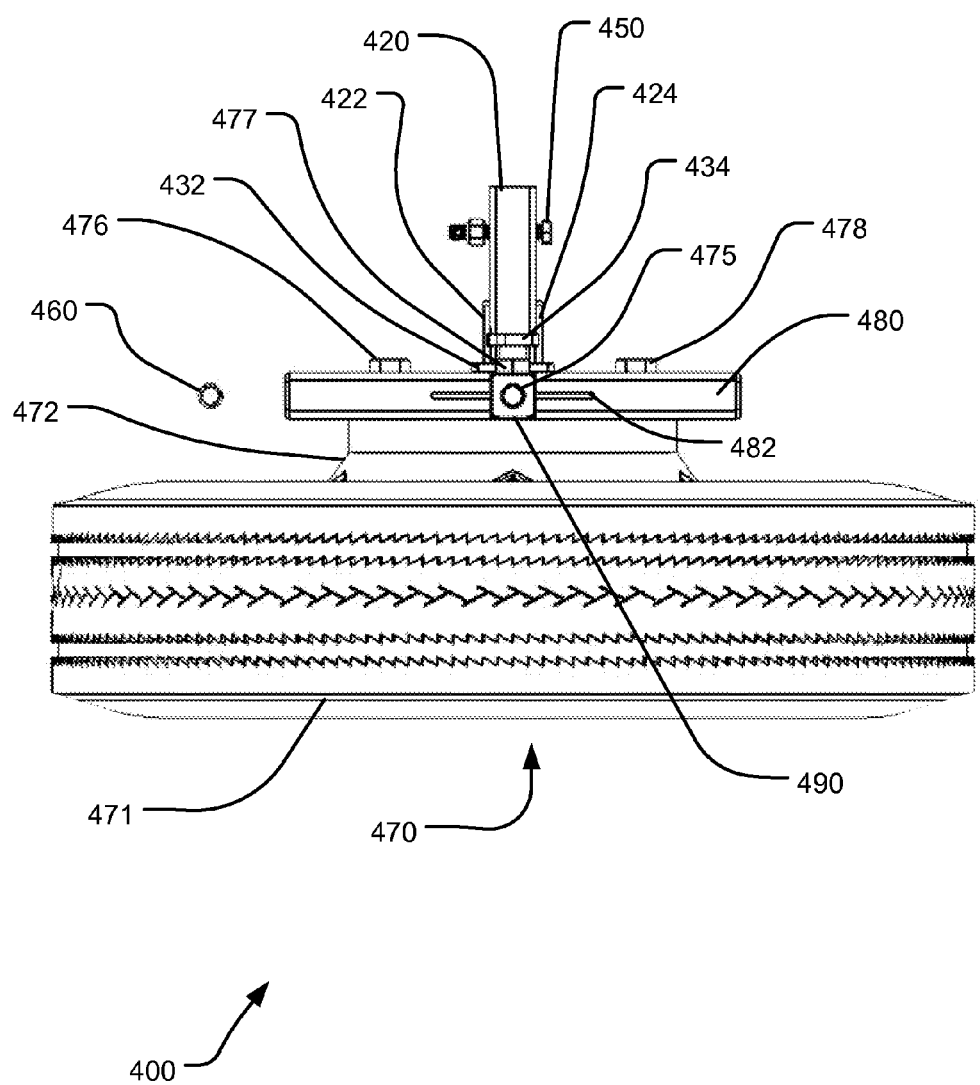
FIG. 4 illustrates a top plan view of an exemplary embodiment of a heavy duty, leveraged spare tire carrier with a spare tire attached.

FIG. 4 illustrates a top plan view of an exemplary embodiment of a heavy duty, leveraged spare tire carrier 400 with a spare tire 470 attached. In this view, the leverage attachment point 475 can be seen extending from the top of the vertical member 490. The top mounting bolt 477 can be seen as can the two side mounting bolts 476 and 478. The mounting bolts extend through the vertical member 490 or horizontal member 480 (depending on the particular bolt) and attach the wheel 472 to the members 480 and 490. The angle supports 482 can be seen running between the vertical member 490 and the horizontal member 480.

Below the top mounting bolt 477, the rear hinge bracket 432 can be seen as can the release pin 434. The vertical support members 422 and 424 are illustrated. As discussed above, the vertical support members 422 and 424 attach to the vertical member 490, the draw bar 420 and the secondary receiver hitch (not shown in FIG. 4, see FIG. 3, item 310). An exemplary hitch pin bolt 450 is also illustrated as is the top surface of the leverage handle 460.

Figure 5:
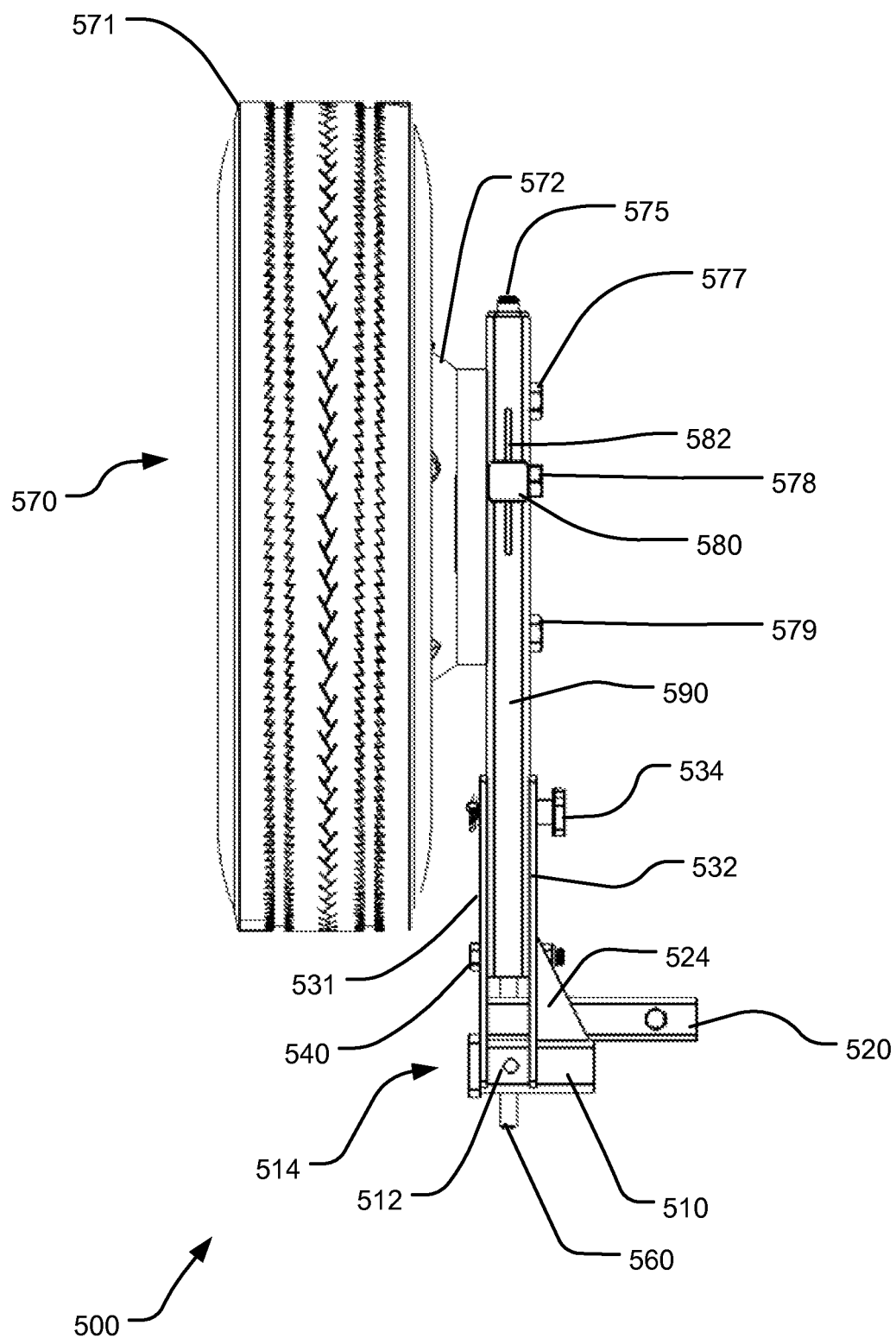
FIG. 5 illustrates a left side elevation view of an exemplary embodiment of a heavy duty, leveraged spare tire carrier with a spare tire attached.

FIG. 5 illustrates a left side elevation view of an exemplary embodiment of a heavy duty, leveraged spare tire carrier 500 with a spare tire 570 (including tire 571 and wheel 572) attached. When viewed from the side, the placement of the vertical member 590 between the front hinge plate 531 and the rear hinge plate 532 can be clearly seen. When the release pin 534 is actuated, the vertical member 590 can then hinge on the hinge bolt 540, causing the spare tire 570 to swing downwards from its upright position. The positions of the horizontal member 580 and angle supports 582 relative to the vertical member 590 are illustrated in FIG. 5 as are the mounting bolts 577, 578 and 579 (the fourth mounting bolt 476 is not visible in FIG. 5, see FIG. 4).

Portions of the leverage handle 560 can be seen, but as it is positioned generally on the other side of the assembly, it is mostly hidden in FIG. 5. The leverage attachment point 575 can, however, be seen near the top of the vertical member 590

The side view of FIG. 5 provides a clear presentation of the vertical support member 524 and it should be obvious that the vertical support member 524 connects to all of the rear hinge plate 532, the draw bar 520, and the secondary receiver hitch 510, thereby enhancing the structural integrity and strength of the assembly. FIG. 5 also shows the front and rear hinge brackets 531 and 532 attaching to both the draw bar 520 and the secondary receiver hitch 510, providing additional strength and support such that a trailer can be connected to the secondary receiver hitch 510 and be fully supported by the carrier 500.

The secondary receiver hitch 510 is illustrated in FIG. 5 with a hitch pin hole 512 and a receiver hitch opening 514, important features in a receiver hitch assembly. In order to use this assembly, a second draw bar would be inserted into the mouth of the receiver hitch opening 514 and a hitch pin would then be inserted through the hitch pin hole 512 and through the second draw bar, securing the second draw bar within the secondary receiver hitch 510.

Figure 6:
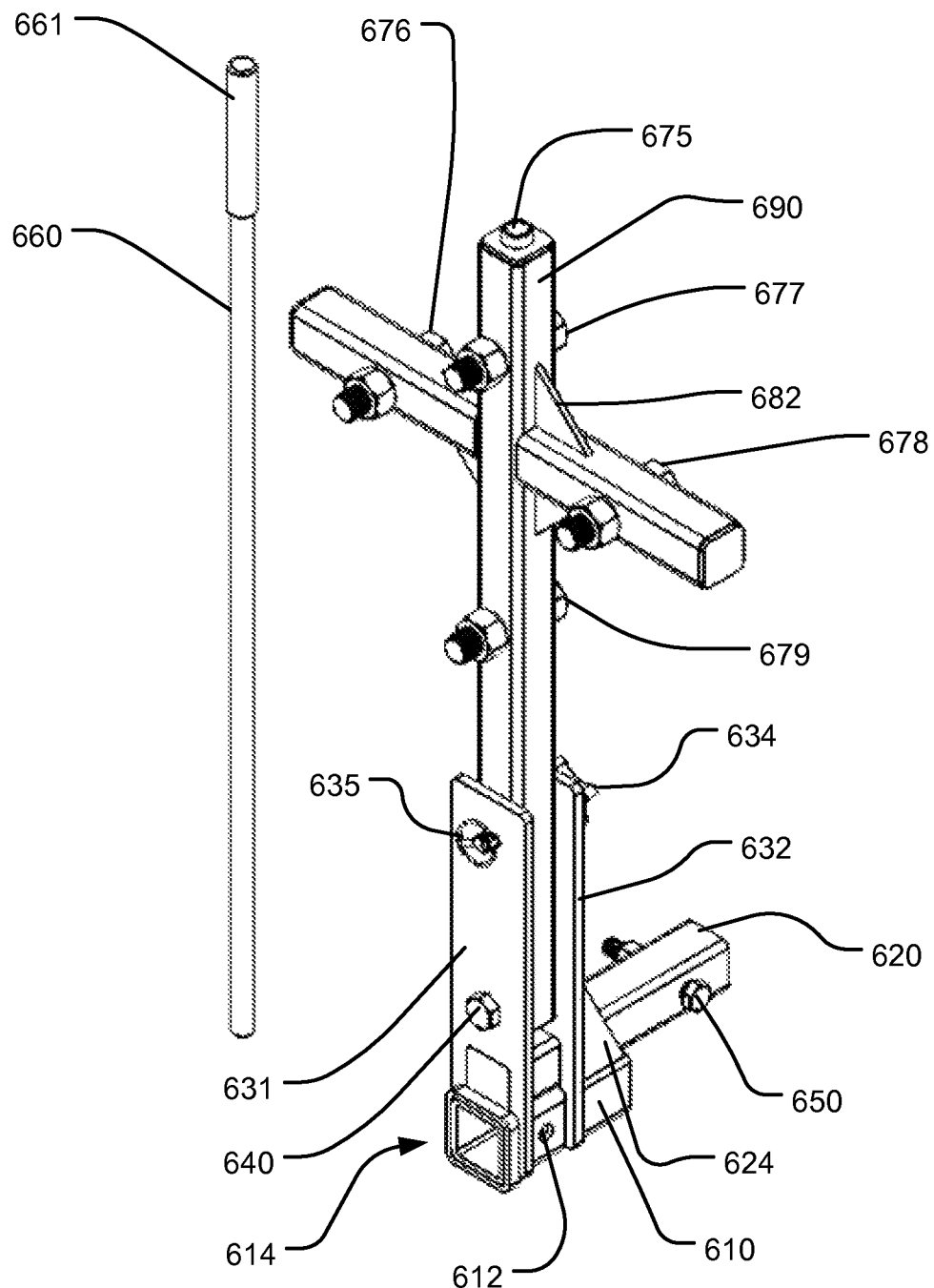
FIG. 6 illustrates a front perspective view of an exemplary embodiment of a heavy duty, leveraged spare tire carrier without a spare tire mounted thereon and placed in the upright, travelling position.

FIG. 6 illustrates a front perspective view of an exemplary embodiment of a heavy duty, leveraged spare tire carrier 600 without a spare tire mounted thereon and placed in the upright, travelling position. With the removal of the spare tire from the carrier 600, most of the components can be seen more clearly.

In the embodiment illustrated in FIG. 6, there are four mounting bolts 676, 677, 678 and 679 that can be used to attach the wheel of the spare tire to the carrier 600. In other embodiments, the number of mounting bolts 676-679 can vary from the four shown in FIG. 6. The mounting bolts are attached to the vertical member 690 and the horizontal member 680. This distributes the weight of the spare tire across the two members, ensuring that the carrier 600 can securely hold the large and unwieldy weight of an RV spare tire assembly. The perspective view of FIG. 6 clearly illustrates the relative positions of the vertical member 690 and the horizontal member 680 as well as the angle supports 682 that enhance the strength of the connections therebetween.

Near the top of the vertical member 690 is the leverage attachment point 675 to which the leverage handle 660 attaches. The leverage handle 660 is illustrated in FIG. 6 as having a grip 661 to ensure that a user has a secure means of gripping the leverage handle 660 when using it to lower or raise the carrier 600.

The front hinge bracket 631 and rear hinge bracket 632 are shown in FIG. 6. Together, the two hinge brackets form a set of upright members affixed to the draw bar 620 and the secondary receiver hitch 610. Vertical support members 422 (not visible in FIG. 6, see item 422 in FIGS. 4) and 624 are affixed to the draw bar 620, the rear hinge bracket 632, and the secondary receiver hitch 610. These support members 422 and 624 strengthen the carrier 600 so that it can securely hold the spare tire while withstanding the large forces exerted on the secondary receiver hitch 610 when a heavy trailer is attached to the RV via the carrier 600.

The main body of the carrier 600 can hinge or swing downwards from the upright position shown in FIG. 6 into a lowered position (see FIG. 7) so that a person can access the rear of the RV and/or can remove the spare tire from the carrier 600. The flat tire from the RV can then be placed on the carrier 600 or the spare tire can be replaced thereon. The hinge bolt 640 extends through the two upright hinge brackets 631 and 632, as well as the vertical member 690 of the main body of the carrier 600. A release pin 634 is attached to at least one of the upright hinge brackets 631 and 632 (in the embodiment shown in FIG. 6, the release pin 634 is shown as penetrating completely through both brackets) and ensures that the vertical member 690 stays in an upright position until the release pin 634 is actuated, thereby releasing the vertical member 690 from its vertical position between the hinge brackets 631 and 632. Once released, the vertical member 690 can hinge on the hinge bolt 640 and be swung down to either side of the carrier 600. In order to actuate the release pin 634 a security pin 635 must first be removed from the distal end of the release pin 634. In other embodiments, other types of release pins 634 are contemplated (for example, a spring actuated release pin 634 could be employed wherein the spring keeps the pin 634 snuggly seated through the rear hinge bracket 632 until the release pin 634 is pulled sharply away from the rear hinge bracket 632, drawing the release pin 634 out of the vertical member 690 so it can swing down; when the release pin 634 is released, the spring brings the release pin 634 back through the rear hinge bracket 632 and into engagement with the vertical member 690, securing it in its upright position).

The vertical member 690 can be manufactured from square steel tubing as shown in FIG. 6. In other embodiments, other metals or materials of sufficient strength can be utilized. In yet other embodiments, the vertical member 690 can be solid and it can have other cross-sectional shapes besides square. In FIG. 6, two of the mounting bolts 679 and 677 are attached to the vertical member 690 and the remaining two mounting bolts 678 and 676 are attached to the horizontal member 680. The horizontal member 680 is attached to the vertical member 690 and generally extends perpendicular thereto, with approximately half of the horizontal member 680 extending to the left of the vertical member 690 and approximately half of the horizontal member 680 extending to the right. The horizontal member 680 can be manufactured from square steel tubing as shown in FIG. 6, but like the vertical member 690, in other embodiments, the horizontal member 680 can be manufactured from other metals or materials of sufficient strength and it can be solid and/or have a cross-sectional shape besides a square (for example, rectangular, round, oval, hexagonal, or other shapes of tubing or solid material can be employed). In order to enhance the strength of the horizontal and vertical members 680 and 690 and the connection therebetween, a plurality of angle supports 682 can be attached at each corner of the joint between the members 680 and 690. As shown in FIG. 6, the plurality of angle supports 682 can be triangular shaped metal pieces that are welded or otherwise connected to the horizontal member 680 and vertical member 690. In other embodiments, the number of angle supports 682 can be none, one, two, three, four, or more.

In order to mount the carrier 600 onto the RV, a draw bar 620 is affixed to the carrier 600. Because installation of a draw bar 620 into the receiver hitch opening on an RV blocks usage of said receiver hitch, a secondary receiver hitch 610 is affixed on the carrier 600 below the draw bar 620. The secondary receiver hitch 610 allows for use of other draw bars so that the RV can still tow trailers, etc. while the heavy duty, leveraged spare tire carrier 600 is installed on the RV. Once the draw bar 620 is inserted into the receiver hitch on the RV, a hitch pin bolt 650 and nut (or other securing device) secures it therein.

An exemplary leverage handle 660 is shown in FIG. 6. This implement is installed in leverage attachment point 675 located near the top of the vertical member 690 when a person wishes to raise or lower the spare tire 670. The leverage handle 660 can be threaded into the leverage attachment point 675, can be simply slid into the leverage attachment point 675, or some other attachment mechanism can be employed so that the leverage handle 660 can act on the vertical member 690. Regardless of the means of attachment, the leverage handle 660 allows a single person to lower and raise the spare tire 670 by hinging the vertical member 690 on the hinge bolt 640. Because the leverage handle 660 extends the distance between the hinge bolt 640 and the location at which a user exerts force against the vertical member 690, significant leverage is gained, thereby allowing a single person to raise and lower the extremely heavy spare tire 670 with ease. See FIG. 7 for additional descriptions of the leverage handle 660, hitch pin bolt 650 and hinging mechanism.

The secondary receiver hitch 610 is illustrated in FIG. 6 with a hitch pin hole 612 and a receiver hitch opening 614, important features in a receiver hitch assembly. In order to use this assembly, a second draw bar would be inserted into the mouth of the receiver hitch opening 614 and a hitch pin would then be inserted through the hitch pin hole 612 and through the second draw bar, securing the second draw bar within the secondary receiver hitch 610.

Figure 7:
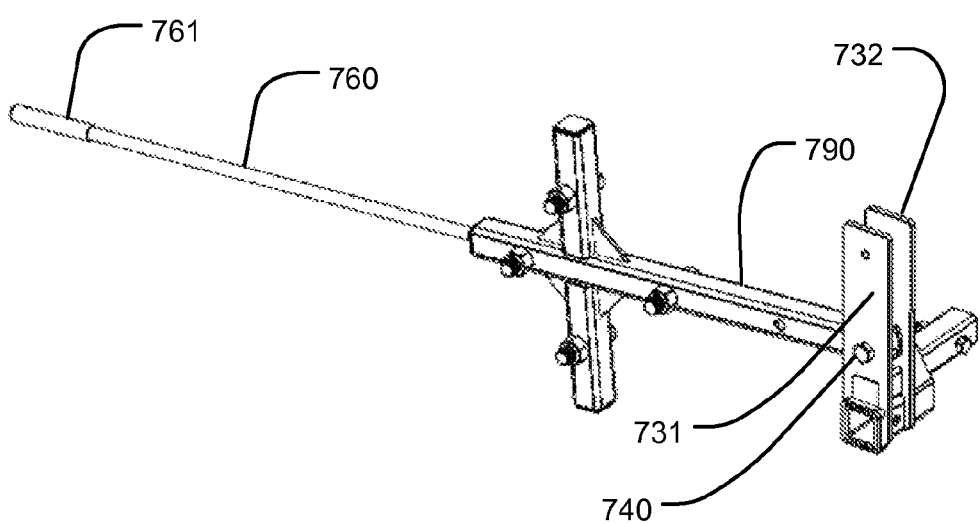
FIG. 7 illustrates a front perspective view of an exemplary embodiment of a heavy duty, leveraged spare tire carrier without a spare tire mounted thereon and lowered into a horizontal, non-travelling position.
Figure 7:
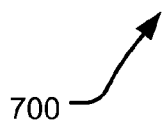

FIG. 7 illustrates a front perspective view of an exemplary embodiment of a heavy duty, leveraged spare tire carrier 700 without a spare tire mounted thereon and lowered into a horizontal, non-travelling position. The leverage handle 760 is shown in its active position, attached to the vertical member 790. By grasping the grip 761, a user can take advantage of the leverage gaining benefits of moving the point of application of force further out from the fulcrum (here, the fulcrum is the hinge bolt 740). The amount of force required to raise or lower the spare tire is much reduced when that force is applied to the grip 761 of the leverage handle 760 versus if it was applied directly to the vertical member 790 itself.

The front and rear hinge brackets 731 and 732 are illustrated in FIG. 7 with the release pin removed, allowing the vertical member 790 to swing downwards on the hinge bolt 740. Note that the carrier 700 is designed such that the vertical member 790 can swing either left or right in the embodiment shown in FIG. 7. In other embodiments, it may be useful to limit the direction of swing to one or the other.

Depending on the height of the RV's receiver hitch, once the vertical member 790 is swung downwards, a spare tire attached to the vertical member 790 will now be resting on the ground. The spare can then be detached from the carrier 700 and rolled away without the user having to lift and/or wrangle the large and weighty tire. The RV's flat tire can then be rolled to the carrier, attached thereto, and the vertical member 790 and flat tire can then be swung back up and into place using the leverage handle 760.

While particular embodiments of the invention have been described and disclosed in the present application, it should be understood that any number of permutations, modifications, or embodiments may be made without departing from the spirit and scope of this invention. Accordingly, it is not the intention of this application to limit this invention in any way except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above "Detailed Description" section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

In light of the above "Detailed Description," the Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The above specification, examples and data provide a description of the structure and use of exemplary implementations of the described articles of manufacture and methods. It is important to note that many implementations can be made without departing from the spirit and scope of the invention.

What is claimed is:

1. A heavy duty, leveraged spare tire carrier, comprising:
   a vertical member having a proximal half and a distal half and a horizontal member attached to the distal half of the vertical member at a juncture, with approximately half of the horizontal member extending to each side of the vertical member such that together the vertical member and the horizontal member form a cross;
   a plurality of angle supports attached at the juncture of the vertical member and the horizontal member and used to strengthen an attachment between the vertical member and the horizontal member, each angle support extending from the vertical member to the horizontal member and helping to permanently affix the members to each other and strengthen the juncture;
   a first hinge bracket and a second hinge bracket, the hinge brackets configured in parallel and placed vertically and in proximity to each other with a portion of the proximal half of the vertical member positioned therebetween;
   a hinge bolt extending through the first and second hinge brackets and through the proximal half of the vertical member placed therebetween, the hinge bolt running generally horizontally therethrough and configured so as to provide a hinge point for the vertical member so that the distal half of the vertical member can swing out from between the first and second hinge brackets while the proximal half remains attached to and between the hinge brackets;
   a plurality of mounting bolts configured to attach a wheel of a spare tire to the distal half of the vertical member and the horizontal member;
   a draw bar attached through a first bottom portion of the first hinge bracket and also attached through a second bottom portion of the second hinge bracket, the draw bar extending generally perpendicular to the first and second hinge brackets and in a rearwards direction, the draw bar being configured to fit within a receiver hitch on a recreational vehicle and attach securely therein;
   a secondary receiver hitch attached to the draw bar and extending generally parallel with the draw bar and perpendicular to the hinge brackets in a frontwards direction, the secondary receiver hitch having a mouth at a distal end, the mouth configured to receive a second draw bar therein, and a proximal end, wherein the proximal end is attached to the draw bar and the secondary receiver hitch passes through the first bottom portion of the first hinge bracket and through the second bottom portion of the second hinge bracket;
   a hitch pin hole running through the secondary receiver hitch between the first hinge bracket and the second hinge bracket and configured to accept a hitch pin through the hitch pin hole, securing any draw bar inserted within the secondary receiver hitch mouth;
   a leverage handle configured to removably attach to a leverage attachment point on the vertical member, the leverage attachment point configured to accept removable attachment of the leverage handle therein; and
   a release pin configured to hold the vertical member in an upright position between the hinge brackets until the release pin is actuated, thereby releasing the distal half of the vertical member and causing the vertical member to be able to hinge about the hinge bolt, thereby causing the vertical member to swing downwards from a vertical position so that any spare tire attached thereto is placed at a ground level.

2. The heavy duty, leveraged spare tire carrier of claim 1, further comprising:
   a first vertical support member affixed to the right side of the draw bar, the second hinge bracket, and the secondary receiver hitch, strengthening an assembly formed thereby; and
   a second vertical support member affixed to the left side of the draw bar, the second hinge bracket, and the secondary receiver hitch, further strengthening the assembly.

3. The heavy duty, leveraged spare tire carrier of claim 1, further comprising:
   the plurality of mounting bolts including a first mounting bolt attached to the distal half of the vertical member and located above the juncture;
   the plurality of mounting bolts including a second mounting bolt attached to the vertical member and located below the juncture;
   the plurality of mounting bolts including a third mounting bolt attached to the horizontal member and located to the right of the juncture; and
   the plurality of mounting bolts including a fourth mounting bolt attached to the horizontal member and located to the left of the juncture.

4. The heavy duty, leveraged spare tire carrier of claim 3, further comprising:
   a first vertical support member affixed to the right side of the draw bar, the second hinge bracket, and the secondary receiver hitch, strengthening an assembly formed thereby; and
   a second vertical support member affixed to the left side of the draw bar, the second hinge bracket, and the secondary receiver hitch, further strengthening the assembly.

5. The heavy duty, leveraged spare tire carrier of claim 1, further comprising:
   a security pin configured to secure the release pin in place and ensure that the release pin can only be actuated once the security pin has been removed therefrom.

6. The heavy duty, leveraged spare tire carrier of claim 5, further comprising:

a first vertical support member affixed to the right side of the draw bar, the second hinge bracket, and the secondary receiver hitch, strengthening an assembly formed thereby; and a second vertical support member affixed to the left side of the draw bar, the second hinge bracket, and the secondary receiver hitch, further strengthening the assembly.

7. The heavy duty, leveraged spare tire carrier of claim 5, further comprising:

a first vertical support member affixed to the right side of the draw bar, the second hinge bracket, and the secondary receiver hitch, strengthening an assembly formed thereby; and a second vertical support member affixed to the left side of the draw bar, the second hinge bracket, and the secondary receiver hitch, further strengthening the assembly.

8. The heavy duty, leveraged spare tire carrier of claim 5, further comprising:

the plurality of mounting bolts including a first mounting bolt attached to the distal half of the vertical member and located above the juncture;

the plurality of mounting bolts including a second mounting bolt attached to the vertical member and located below the juncture;

the plurality of mounting bolts including a third mounting bolt attached to the horizontal member and located to the right of the juncture; and the plurality of mounting bolts including a fourth mounting bolt attached to the horizontal member and located to the left of the juncture.

9. The heavy duty, leveraged spare tire carrier of claim 8, further comprising:

a first vertical support member affixed to the right side of the draw bar, the second hinge bracket, and the secondary receiver hitch, strengthening an assembly formed thereby; and a second vertical support member affixed to the left side of the draw bar, the second hinge bracket, and the secondary receiver hitch, further strengthening the assembly.

10. The heavy duty, leveraged spare tire carrier of claim 1, further comprising:

the leverage handle having a grip that provides a secure means of gripping the leverage handle when using it to lower or raise the carrier.

11. The heavy duty, leveraged spare tire carrier of claim 10, further comprising:

a first vertical support member affixed to the right side of the draw bar, the second hinge bracket, and the secondary receiver hitch, strengthening an assembly formed thereby; and a second vertical support member affixed to the left side of the draw bar, the second hinge bracket, and the secondary receiver hitch, further strengthening the assembly.

12. The heavy duty, leveraged spare tire carrier of claim 10, further comprising:

the plurality of mounting bolts including a first mounting bolt attached to the distal half of the vertical member and located above the juncture;

the plurality of mounting bolts including a second mounting bolt attached to the vertical member and located below the juncture;

the plurality of mounting bolts including a third mounting bolt attached to the horizontal member and located to the right of the juncture; and the plurality of mounting bolts including a fourth mounting bolt attached to the horizontal member and located to the left of the juncture.

13. The heavy duty, leveraged spare tire carrier of claim 12, further comprising:

a first vertical support member affixed to the right side of the draw bar, the second hinge bracket, and the secondary receiver hitch, strengthening an assembly formed thereby; and a second vertical support member affixed to the left side of the draw bar, the second hinge bracket, and the secondary receiver hitch, further strengthening the assembly.

14. The heavy duty, leveraged spare tire carrier of claim 10, further comprising:

a security pin configured to secure the release pin in place and ensure that the release pin can only be actuated once the security pin has been removed therefrom.

15. The heavy duty, leveraged spare tire carrier of claim 14, further comprising:

a first vertical support member affixed to the right side of the draw bar, the second hinge bracket, and the secondary receiver hitch, strengthening an assembly formed thereby; and a second vertical support member affixed to the left side of the draw bar, the second hinge bracket, and the secondary receiver hitch, further strengthening the assembly.

16. The heavy duty, leveraged spare tire carrier of claim 14, further comprising:

the plurality of mounting bolts including a first mounting bolt attached to the distal half of the vertical member and located above the juncture;

the plurality of mounting bolts including a second mounting bolt attached to the vertical member and located below the juncture;

the plurality of mounting bolts including a third mounting bolt attached to the horizontal member and located to the right of the juncture; and the plurality of mounting bolts including a fourth mounting bolt attached to the horizontal member and located to the left of the juncture.

17. The heavy duty, leveraged spare tire carrier of claim 16, further comprising:

a first vertical support member affixed to the right side of the draw bar, the second hinge bracket, and the secondary receiver hitch, strengthening an assembly formed thereby; and a second vertical support member affixed to the left side of the draw bar, the second hinge bracket, and the secondary receiver hitch, further strengthening the assembly.

\* \* \* \* \*